(12) United States Patent
Sung et al.

(10) Patent No.: US 8,928,764 B2
(45) Date of Patent: Jan. 6, 2015

(54) METHOD AND DEVICE FOR CORRECTING USER'S HAND TREMOR IN IMAGING DEVICE

(71) Applicant: Samsung Electronics Co., Ltd., Gyeonggi-do (KR)

(72) Inventors: Woon-Tahk Sung, Seoul (KR); Jae-Myung Baek, Gyeonggi-do (KR); Dong-Youl Park, Gyeonggi-do (KR); Young-Kwon Yoon, Seoul (KR); Soon-Kyoung Choi, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 13/774,312

(22) Filed: Feb. 22, 2013

(65) Prior Publication Data

US 2013/0215283 A1 Aug. 22, 2013

(30) Foreign Application Priority Data

Feb. 22, 2012 (KR) .................. 10-2012-0017826

(51) Int. Cl.
*H04N 5/232* (2006.01)

(52) U.S. Cl.
CPC ................. *H04N 5/23264* (2013.01)
USPC ................. 348/208.5; 348/208.2

(58) Field of Classification Search
None
See application file for complete search history.

(56) References Cited

U.S. PATENT DOCUMENTS 7,856,176 B2 12/2010 Yoon et al.
8,049,785 B2 * 11/2011 Han et al. ................. 348/208.99

* cited by examiner

*Primary Examiner* — Twyler Haskins
*Assistant Examiner* — Angel L Garces-Rivera
(74) *Attorney, Agent, or Firm* — The Farrell Law Firm, P.C.

(57) ABSTRACT

A method for correcting a user's tremor of an imaging device includes determining intensities of tremors of a plurality of temporary images, comparing the intensities of tremors with a reference value, and selecting a temporary image having an tremor intensity equal to or less than the reference value from the plurality of temporary images.

10 Claims, 3 Drawing Sheets

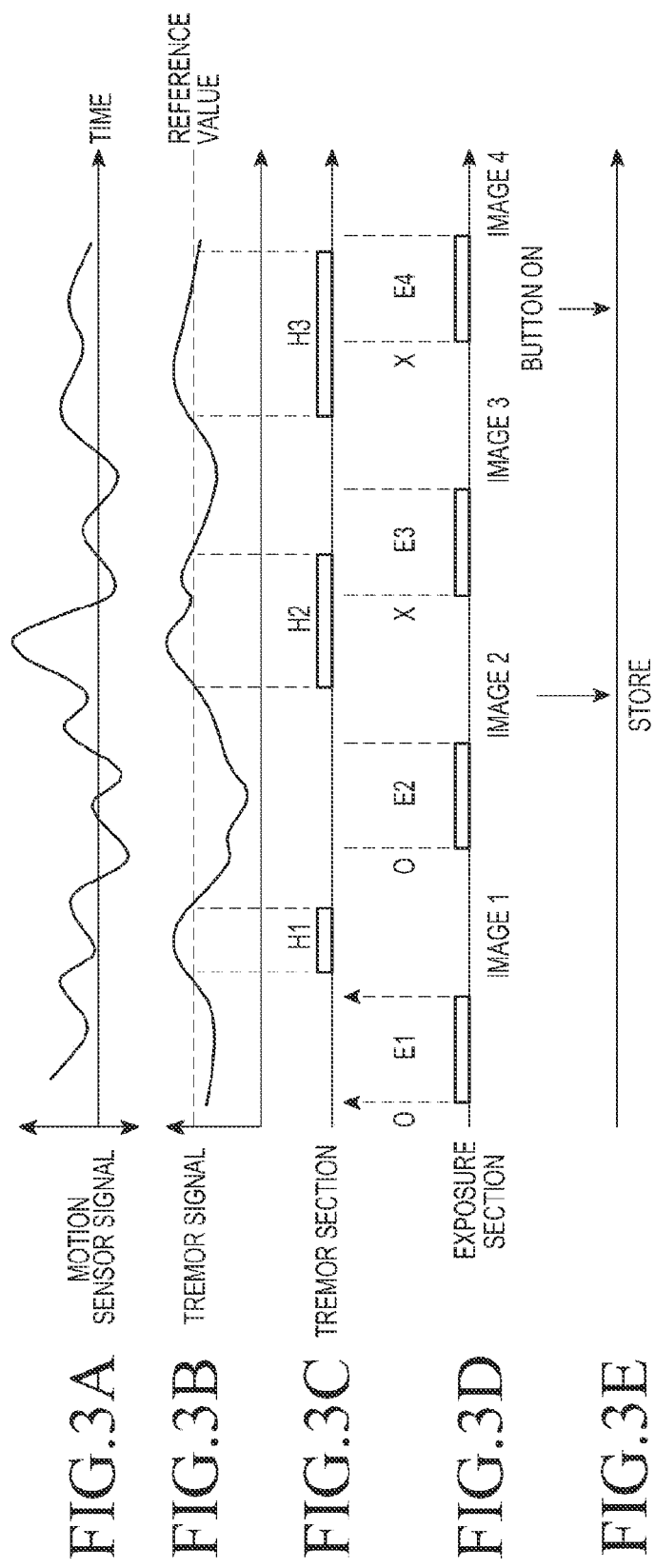

METHOD AND DEVICE FOR CORRECTING USER'S HAND TREMOR IN IMAGING DEVICE

PRIORITY

This application claims priority under 35 U.S.C. §119(a) to Korean Application Serial No. 10-2012-0017826, which was filed in the Korean Intellectual Property Office on Feb. 22, 2012, the contents of which are incorporated herein by reference.

BACKGROUND OF THE INVENTION

1. Field of the Invention

The present invention relates generally to an imaging device such as a digital camera and a camera phone, and more particularly, to a method for obtaining a clear image by using a motion sensor signal while excluding an image shaken due to a user's tremor from continuously photographed pictures.

2. Description of the Related Art

Methods for preventing an image from being shaken due to a user's tremor in a device according to the related art are generally classified into an optical type and a digital type.

An Optical Image Stabilization (OIS) method involves detecting a magnitude and a direction of a user's tremor by using a motion sensor such as a gyroscope and moving a lens or an image sensor in an opposite direction to obtain an image which has not been shaken. This method exhibits excellent performance but requires a precise mechanical apparatus of a rather large size and relatively high manufacturing cost, rendering it inapplicable to a small-sized device such as a mobile phone.

A digital image stabilization method involves analyzing an image converted to a digital signal that is corrected through image processing. This method does not require additional size or costs, but involves a lengthy processing time and is limited in terms of pixel capacity.

SUMMARY OF THE INVENTION

Accordingly, an aspect of the present invention is to solve at least the above-described problems occurring in the prior art, and to provide at least the advantages described below.

Another aspect of the present invention is to provide a method of detecting a user's tremor by using a motion sensor such as a gyroscope in an imaging device such as a digital camera and a camera phone, and selecting an image photographed when a user's tremor correspond to a reference value or less based on a signal to promptly obtain an image which has not been shaken.

In accordance with another aspect of the present invention, there is provided a method for correcting a user's tremor of an imaging device, the method including determining intensities of tremors of a plurality of temporary images, comparing the intensities of tremors with a (preset) reference value, and selecting a temporary image having a tremor intensity equal to or less than the reference value or less from the plurality of temporary images.

In accordance with another aspect of the present invention, there is provided a method for correcting a user's tremor of an imaging device, the method including determining intensities of tremors of a plurality of temporary images, comparing the intensities of tremors, and selecting a temporary image having a minimum tremor intensity from the plurality of temporary images and storing the selected temporary image in a memory.

BRIEF DESCRIPTION OF THE DRAWINGS

The above and other aspects, features, and advantages of the present invention will be more apparent from the following detailed description taken in conjunction with the accompanying drawings, in which:

FIGS. 3A to 3E illustrate a method of correcting a user's tremor according to an embodiment of the present invention.

DETAILED DESCRIPTION OF EMBODIMENTS OF THE PRESENT INVENTION

Hereinafter, various embodiments of the present invention will be described with reference to the accompanying drawings. In the following description, a detailed description of known functions and configurations incorporated herein will be omitted for the sake of clarity and conciseness.

Figure 1:
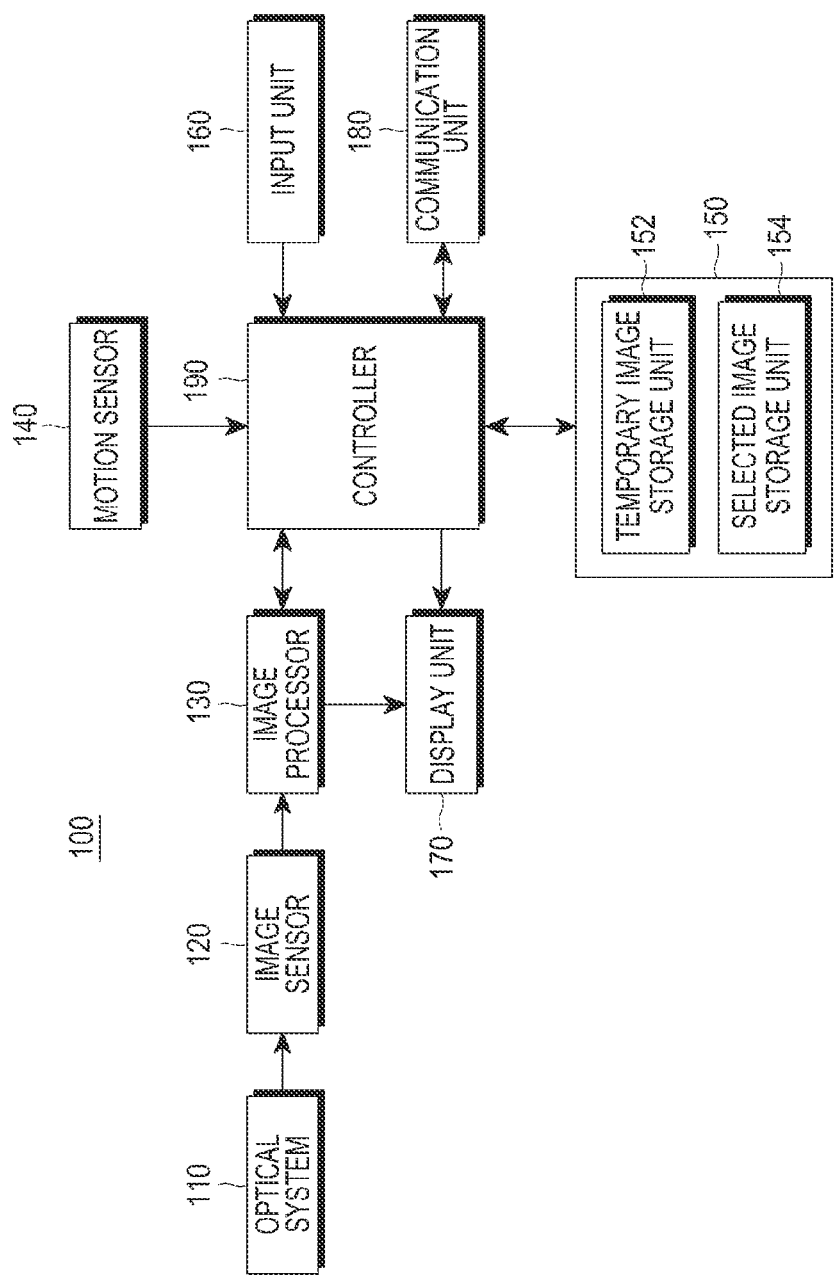
FIG. 1 illustrates an imaging device according to an embodiment of the present invention.

FIG. 1 illustrates an imaging device according to an embodiment of the present invention. The imaging device 100 includes an optical system 110, an image sensor 120, an image processor 130, a motion sensor 140, a memory 150, an input unit 160, a display unit 170, a communication unit 180, and a control unit 190. The imaging device 100 may further include a speaker (not shown) for outputting a sound and a microphone (not shown) for inputting a sound. The imaging device 100 may be a camera, a camcorder, a portable terminal (such as a mobile phone, a console, or a Personal Digital Assistant (PDA)), or a tablet Personal Computer (PC).

The optical system 110 includes at least one lens, and converges light which is incident from a subject through at least one lens on a light receiving surface of the image sensor 120 to form an image of the subject. The lens may be, for example, a convex lens or an aspheric lens.

The image sensor 120 detects an optical image formed by the optical system 110 as an electrical image signal, and includes a plurality of pixel units disposed in an M by N matrix structure, each of the pixel units including a photo diode and a plurality of transistors. The pixel unit accumulates a charge produced by incident light, and a voltage due to the accumulated charge represents an intensity of illumination of the incident light. When an image constituting a still image or a moving image is processed, an image signal output from the image sensor 120 is constituted by a set of voltages (that is, pixel values) output from the pixel units and the image signal represents one image frame (that is, a still image). The image frame includes M by N pixels. The image sensor may be, for example, a Charge-Coupled Device (CCD) image sensor or a Complementary Metal-Oxide Semiconductor (CMOS) image sensor.

The image processor 130 processes an image signal input from the image sensor 120 in units of frames under the control of the control unit 190, and outputs an image (or image frame) converted to be suitable for a user environment setting, in terms of such parameter as size, screen quality, and resolution.

The motion sensor 140 detects a movement of the imaging device 100, and detects a user's tremor through the movement of the imaging device 100. The motion sensor 140 may be one of or a combination of an acceleration or inclination sensor for detecting an inclination of the imaging device 100, a gyro sensor for detecting a rotation of the imaging device 100, and a gravity sensor for detecting a terrestrial magnetism to measure a direction of the imaging device 100.

The memory 150 stores images output from the image processor 130 under the control of the control unit 190 or directly. The memory 150 may store images for providing applications for various functions and Graphical User Interfaces (GUIs) related thereto, databases related to user information, documents, background images (such as a menu screen or a standby screen) required to drive the imaging device or operation programs, for example. The memory 150 includes a temporary image storage unit 152 for storing temporary images which cannot be accessed by or displayed to the user, and a selected image storage unit 154 for storing selected images which can be accessed by or displayed to the user. The temporary image storage unit 152 and the selected image storage unit 154 may be folders created in the memory 150. The temporary image storage unit 152 and the selected image storage unit 154 may be separate physical memories or included together in the memory 150, as shown.

The input unit 160 receives a user input or instruction, and outputs the received user input or instruction to the control unit 190. The input unit 160 may include, for example, a shutter button, a keypad, and/or a touch panel.

The display unit 170 displays an image or data (including data relevant to an image and data of a text irrelevant to an image) input from the image processor 130 or the control unit 190 on a screen. The display unit 170 may be, for example, a liquid crystal display unit or a touch screen. The touch screen displays an image under the control of the control unit 190, generates a key contact interrupt if a user input means such as a finger or a stylus pen contacts a surface of the touch screen, and outputs user input information including an input coordinate and an input state to the control unit 190 under the control of the control unit 190. The display unit 170 may display an image input from the image processor 130 in a preview state.

The communication unit 180 receives a wireless downstream signal from the air by using an antenna, and outputs downstream data obtained by demodulating the wireless downstream signal to the control unit 190. The communication unit 180 modulates upstream data input from the control unit 190 to generate a wireless upstream signal, and wirelessly transmits the generated wireless upstream signal to the air by using an antenna. The modulation and demodulation may be implemented, for example, through a Code Division Multiple Access (CDMA) method, or through methods such as Frequency Division Multiplexing (FDM) or Time Division Multiplexing (TDM).

The control unit 190 selects a temporary image in which a user's tremor corresponds to a reference value (or threshold value) or less or is minimal from the temporary images stored in the temporary image storage unit 152 of the memory 150, and stores the selected temporary image in the selected image storage unit 154 while either displaying or not displaying the selected temporary image to the user.

Figure 2:
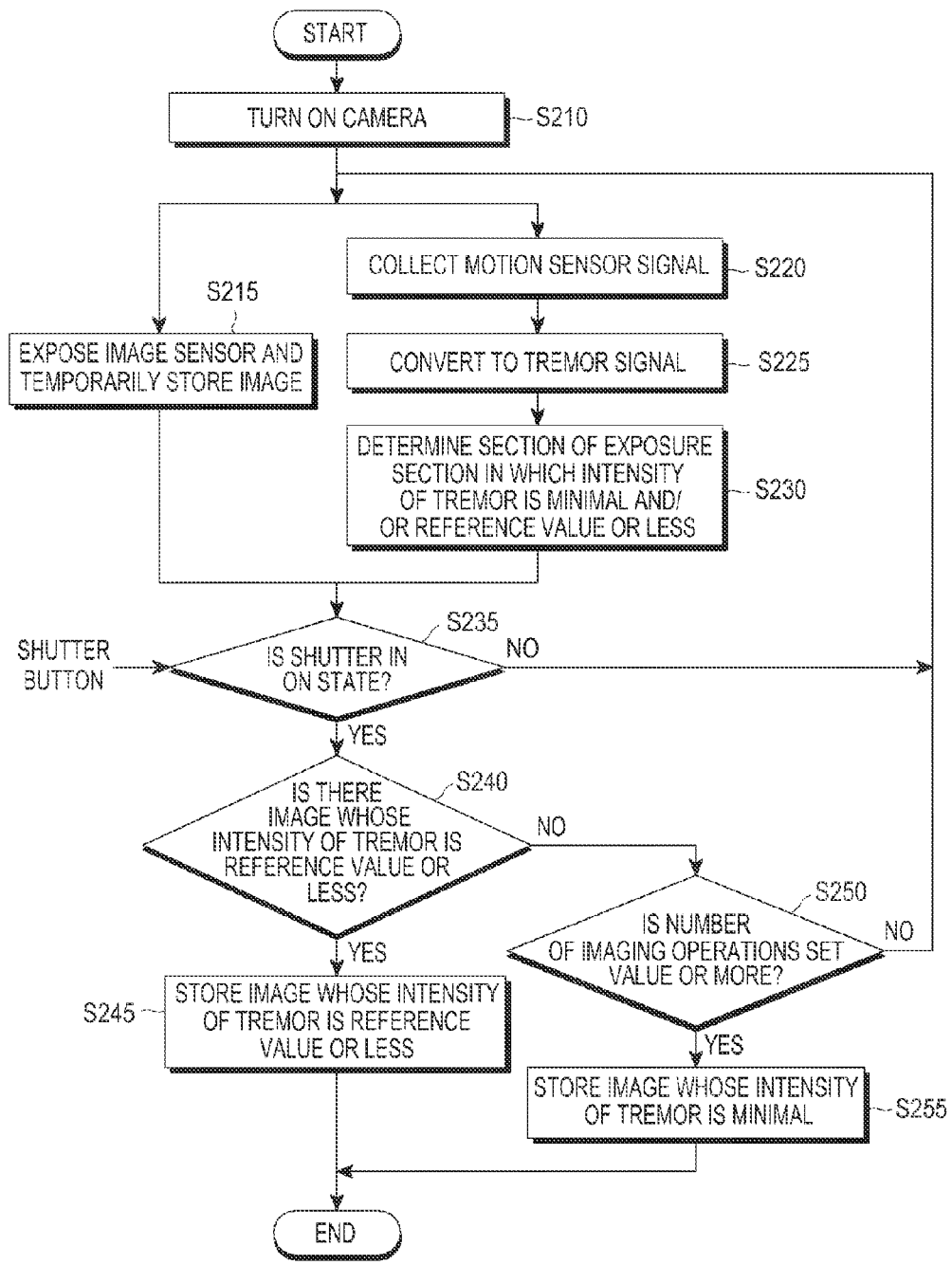
FIG. 2 illustrates a method of correcting a user's tremor by the imaging device according to an embodiment of the present invention.

FIG. 2 illustrates a method of correcting a user's tremor by the imaging device according to an embodiment of the present invention. FIG. 3 illustrates the method of correcting a user's tremor.

When receiving a drive instruction (such as "power on") of the user through manipulation of the input unit 160 (such as a power button) or the imaging device 100 or receiving a tremor correction instruction of the user through the input unit 160 (such as a tremor correcting function button) in step S210, the control unit 190 performs steps S215 to S255. Unlike this example, when the imaging device 100 is driven through an environment setting of the imaging device 100 through the input unit 160 in advance, the user may set such that the tremor correcting function is automatically activated. When steps S215 to S230 are performed when or while the user pushes a half shutter (that is, the shutter button is pushed about halfway instead of fully pushed), or may be performed when or while the user pushes a shutter button in a burst mode. Steps S215 to S230 may be performed between step S235 and step S240 when a tremor correction instruction is not received in step S210.

In the present invention, a button includes a soft button on a touch screen and a mechanical button, and while it is described that an imaging instruction is input by pushing a shutter button, the imaging instruction may also be a voice, a setting of a timer during a timer mode, or a gesture of a user according to recognition of a motion.

Step S215 and steps S220 to S230 are performed in parallel and are repeatedly performed.

In step S215, the image sensor 120 repeats exposure and output of an image signal, the image processor 130 having received the image signal outputs an image (or image frame) converted to be suitable for a user environment setting (such as a size, screen quality, and resolution), and the control unit 190 stores the converted images in the memory 150, such as in the temporary image storage unit 152 in a First In First Out (FIFO) method. That is, the user may set the total number of temporary images in image preservation period units, the number of images, or memory capacities through an environment setting of the imaging device 100 through the input unit 160 in advance. The total number of temporary images may be automatically set to a default value. For example, when the total number of temporary images is set to 5, the first temporary image is deleted if the sixth temporary image is stored in the temporary image storage unit 152. The control unit 190 may allocate identifiers to the temporary images created sequentially and may store a table in which identifiers for the temporary images, memory addresses, and exposure time points (or image creating time points) are recorded in the memory 150.

In step S220, the motion sensor 140 outputs a motion sensor signal (that is, a motion monitoring signal) changed according to a motion of the imaging device 100 to the control unit 190.

FIG. 3A illustrates a change of a motion sensor signal according to lapse of time. As illustrated, a change width of an intensity of a motion sensor signal is large in a time section in which a user's tremor is large, while a change width of an intensity of a motion sensor signal is small in a time section in which a user's tremor is small. Since the motion sensor signal does not show a direct intensity of a tremor, or it does not include direction information of a motion, step S225 in FIG. 2 is performed.

In step S225, the control unit 190 converts the motion sensor signal to a tremor signal through processing such as filtering or integration, and the tremor signal shows an intensity of a tremor at each time point (or time). While it is described that the control unit 190 calculates a tremor signal in this example, the motion sensor 140 may directly output tremor information or tremor time period section (or time section) information.

When a rolling shutter type image sensor such as a CMOS is used as the image sensor 120, exposure timings are different for sequentially exposed scanning lines. Thus, when an intensity of a tremor is calculated by the rolling shutter type image sensor, consideration is given for an effective exposure time period for each pixel in a total exposure time period for one image.

FIG. 3B illustrates a change of a tremor signal according to lapse of time. In comparison with the motion sensor signal, a change width of an intensity of a tremor signal is large in a time section in which a change width of an intensity of a motion sensor signal is large, while an intensity of a tremor signal is small in a time section in which a change width of an intensity of a motion sensor signal is small.

Returning to FIG. 2, in step S230, the control unit 190 determines an exposure time section which pertains to a time section in which an intensity of a tremor corresponds to a reference value or less in a time period or interval (that is, a reference time period or interval) in exposure time sections of the image sensor 120 related to the temporary images stored in the memory 150, or in which an intensity of a tremor is small during a time period or interval. That is, step S230 may be performed in real time or periodically. The control unit 190 may be aware of information on an exposure time section in advance or may receive information on an exposure time section from the image sensor.

While it is explained that the control unit 190 determines an exposure time section in this example, since an exposure time section and an image created in the exposure time section correspond to each other, the control unit 190 may determine a temporary image corresponding to an exposure time section instead of the exposure time section. The control unit 190 may periodically store information on an exposure time section in which an intensity of a tremor corresponds to a reference value or less and/or information on a determined temporary image in the memory 150 periodically or according to a reference time period. Step S215 (or step S220) or step S230 may be repeated in continuous cycles according to a reference time period.

FIG. 3C illustrates tremor time sections H1 to H3 in which intensities of tremors correspond to a reference value or more. In a time axis, time sections other than the tremor time sections H1 to H3 correspond to non-tremor time sections.

FIG. 3D illustrates exposure time sections E1 to E4 of an image sensor and temporary images (first to fourth images) created and stored in correspondence thereto.

It is assumed that the reference time period is set to be a time interval ranging from a starting point of the first exposure time section E1 to a starting point of the fourth exposure section E4.

The control unit 190 determines that among the first to third exposure time sections E1 to E3, the first and second exposure time sections E1 and E2 are located in non-tremor time sections and the third exposure time section E3 is located in the tremor time section H2. The control unit 190 stores information on the first and second exposure time sections E1 and E2 and/or information on the first and second temporary images (the first and second images) in the memory 150.

When there is no exposure time section in which an intensity of a tremor is located in a time section corresponding to a reference value or less, or regardless thereof, the control unit 190 may determine a second exposure time section in which an intensity of a tremor is small during the reference time period, or may store information on the second exposure time section and/or information on the second temporary image (the first and second images) in memory 150.

Returning to FIG. 2, in step S235, the control unit 190 determines whether the user pushes the shutter button, that is, whether the shutter is in an on state. If the shutter is in an on state, the method proceeds to step S240, and if the shutter is in an off state, the method returns to steps S215 and S220.

FIG. 3E illustrates a time point when the shutter is changed into an on state, and the second temporary image is stored in the selected image storage unit 154 of the memory 150.

Returning to FIG. 2, in step S240, the control unit 190 determines whether a temporary image whose intensity of a tremor corresponds to the reference value or less during the reference time period. If there exists a temporary image whose intensity of a tremor is the reference value or less, step S245 is performed, and if there does not exist a temporary image whose intensity of a tremor is the reference value or less, step S250 is performed. An intensity of a tremor of a temporary image may be represented by an average intensity of a tremor signal generated in a time section in which the temporary image is created.

When step S215 (or step S220) to step 230 are repeated according to a reference time period, the control unit 190 determines that an intensity of a tremor is a reference value or less in the current cycle including a shutter on time point or a cycle shortly before the current cycle to determine information on the temporary image stored in the memory 150. When a shutter on time point is located at a middle point of the current cycle or step S215 (or step S220) to step S230 are performed after the shutter on time point, the control unit 190 determines a temporary image whose intensity of a tremor is a reference value or less in reference time periods shortly before, immediately after, or before and after the shutter on time point. For example, referring to FIG. 3D, the control unit 190 determines that a temporary image whose intensity of a tremor produced at a time point closest to the shutter on time point is a reference value or less is a second temporary image, and selects the second temporary image as a target of storage.

When step S215 (or step S220) to step S230 are performed after the shutter on time point, step S215 (or step S220) to step S230 may be repeated during the reference time period or while the number of temporary images (that is, the number of imaging operations) is a reference value or more.

In step S245, the control unit 190 stores a selected temporary image whose intensity of a tremor is identified to be a reference value or less during the reference time period in the selected image storage unit 154 of the memory 150.

In step S250, the control unit 190 determines whether the number of temporary images (that is, the number of imaging operations) created during the reference time period which has not been completed corresponds to a reference value or more. For example, when the shutter on time point is located at a middle point of the current cycle or when the number of temporary images created during the reference time period which has not been completed is too small, it may be unsuitable to select and store one from the temporary images. Thus, when the number of temporary images (that is, the number of imaging operations) created during the reference time period which has not been completed corresponds to a reference value or more, step S255 is performed, while in the case of the reference value or less, step S215 and step S220 are performed. That is, the control unit 190 repeatedly performs step S215 (or step S220) to step S230 until the number of temporary images (that is, the number of imaging operations) corresponds to the reference value or more.

In step S255, the control unit 190 stores a selected temporary image whose tremor intensity is determined to be small during the reference time period in the selected image storage unit 154 of the memory 150.

The present invention allows an imaging device such as a digital camera and a camera phone to detect a user's tremor by using a motion sensor such as a gyroscope so that a captured image can be selected based on a signal, thereby making it possible to promptly obtain an image having no tremor.

Embodiments of the present invention may be realized in the form of hardware, software, or a combination of hardware and software. For example, regardless of possibility of the software being deleted or rerecorded, the software may be stored in a volatile or non-volatile storage unit such as a Read-Only Memory (ROM), a Random Access Memory (RAM), a memory chip, a unit or an integrated circuit, or an optically or magnetically recordable and machine (for example, computer)-readable storage medium such as a Compact Disc (CD), a Digital Video Disc (DVD), a magnetic disk or a magnetic tape. It can be seen that the memory which can be included in an imaging device is an example of a storage medium of a program including instructions for realizing the embodiments of the present invention or a storage medium which can be read by a machine suitable for storing the programs. Thus, the present invention includes a unit described in any claim, a program including a code for realizing the method, and a storage medium which can be read by a machine for storing a program. Further, the program may be electrically transferred through any medium such as a communication signal transferred through a wired or wireless connection, and the present invention properly includes their equivalents.

The imaging device of the present invention may receive the program in a wired or wireless manner from a program providing unit, which includes a program including instructions for allowing the imaging device to perform a method for correcting a user's tremor, a memory for storing update information of the program, a communication unit for performing a wired or wireless communication with the imaging device, and a control unit for transmitting the program to the imaging device upon a request of the imaging device or automatically.

Although the present invention has been described with reference to the detailed embodiments thereof, various modifications may be made without departing from the scope of the present invention. Thus, the scope of the present invention is not determined by the embodiments but by the claims and their equivalents.

What is claimed is:

1. A method for correcting a user's tremor of an imaging device, the method comprising:
   determining intensities of tremors of a plurality of temporary images;
   comparing the intensities of tremors with a first reference value; and
   selecting a temporary image, having a tremor intensity equal to or less than the first reference value, from the plurality of temporary images,
   wherein determining the intensities comprises:
      generating a motion monitoring signal of the imaging device;
      generating a tremor signal from the motion monitoring signal; and
      determining an intensity of the tremor signal generated in a time section in which each temporary image is created.

2. The method of claim 1, wherein determining the intensities, comparing the intensities, and selecting the temporary image are repeatedly performed on the temporary images created during a reference time period.

3. The method of claim 1, wherein determining the intensities, comparing the intensities, and selecting the temporary image are performed on the temporary images created during a reference time period, and a starting time point and an ending time point of the reference time period are set with reference to a user-instructed time point.

4. The method of claim 1, further comprising, when there is no temporary image having a tremor intensity corresponding to the first reference value or less among the plurality of temporary images, selecting a temporary image having a minimum tremor intensity from the plurality of temporary images.

5. The method of claim 1, further comprising:
   comparing a total number of the plurality of temporary images with a second reference value; and
   when the total number of the plurality of temporary images is the second reference value or less, creating temporary images whose total number is equal to a difference between the total number of the plurality of temporary images and the second reference value.

6. The method of claim 1, further comprising storing the selected temporary image in a memory.

7. A method for correcting a user's tremor of an imaging device, the method comprising:
   determining intensities of tremors of a plurality of temporary images;
   comparing the intensities of tremors;
   selecting a temporary image, having a minimum tremor intensity, from the plurality of temporary images; and
   storing the selected temporary image in a memory,
   wherein determining the intensities comprises:
      generating a motion monitoring signal of the imaging device;
      generating a tremor signal from the motion monitoring signal; and
      determining an intensity of the tremor signal generated in a time section in which each temporary image is created.

8. The method of claim 7, further comprising:
   comparing a total number of the plurality of temporary images with a reference value; and
   when the total number of the plurality of temporary images is the reference value or less, further creating temporary images whose total number is equal to a difference between the total number of the plurality of temporary images and the reference value.

9. A non-transitory machine-readable storage medium in which is recorded a program for executing a method for correcting a user's tremor of an imaging device, the method comprising:
   determining intensities of tremors of a plurality of temporary images;
   comparing the intensities of tremors with a reference value; and
   selecting a temporary image, having a tremor intensity equal to or less than the reference value, from the plurality of temporary images,
   wherein determining the intensities comprises:
      generating a motion monitoring signal of the imaging device;
      generating a tremor signal from the motion monitoring signal; and
      determining an intensity of the tremor signal generated in a time section in which each temporary image is created.

10. An imaging device comprising:
    a sensor configured to detects tremors; and
    a controller configured to determines intensities of the tremors of a plurality of temporary images;
    compares the intensities of tremors with a reference value; and
    selects a temporary image, having a tremor intensity equal to or less than the reference value from the plurality of temporary images,
    wherein determining the intensities comprises:

generating a motion monitoring signal of the imaging device;
generating a tremor signal from the motion monitoring signal; and
determining an intensity of the tremor signal generated in a time section in which each temporary image is created.

\* \* \* \* \*